US012757185B2

(12) United States Patent
Eleftheriadis et al.

(10) Patent No.: US 12,757,185 B2
(45) Date of Patent: Oct. 6, 2026

(54) SCHEDULING TRANSMISSIONS OF INTERNET OF THINGS DEVICES

(71) Applicant: Telefonaktiebolaget LM Ericsson (publ), Stockholm (SE)

(72) Inventors: Lackis Eleftheriadis, Valbo (SE); Swarup Kumar Mohalik, Bangalore Karnataka (IN); Anusha Pradeep Mujumdar, Bangalore (IN); Ramamurthy Badrinath, Bangalore Karnataka (IN); Konstantinos Vandikas, Solna (SE); Cecilia Nyström, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 553 days.

(21) Appl. No.: 18/043,386

(22) PCT Filed: Sep. 11, 2020

(86) PCT No.: PCT/EP2020/075520
§ 371 (c)(1),
(2) Date: Feb. 28, 2023

(87) PCT Pub. No.: WO2022/053144
PCT Pub. Date: Mar. 17, 2022

(65) Prior Publication Data

US 2024/0015726 A1 Jan. 11, 2024

(51) Int. Cl.
*H04W 72/121* (2023.01)
*H04L 5/00* (2006.01)
*H04W 52/02* (2009.01)

(52) U.S. Cl.
CPC ......... *H04W 72/121* (2013.01); *H04L 5/0053* (2013.01); *H04W 52/0216* (2013.01)

(58) Field of Classification Search
CPC . H04W 72/121; H04W 52/0216; H04W 4/70; H04W 52/0212; H04L 5/0053; Y02D 30/70
See application file for complete search history.

(56) References Cited

U.S. PATENT DOCUMENTS 10,856,228 B1 * 12/2020 Chu .................. H04W 52/0235
11,431,581 B2 * 8/2022 Rodriguez .............. H04L 67/12
(Continued)

FOREIGN PATENT DOCUMENTS

CN 107820321 A * 3/2018 .......... H04W 72/542
CN 108293263 A 7/2018

OTHER PUBLICATIONS

Chinese Office Action and English summary translation dated Dec. 11, 2024, for Application No. 202080104938.1, consisting of 10 pages.

(Continued)

*Primary Examiner* — Khaled M Kassim
*Assistant Examiner* — Christopher A. Reyes
(74) *Attorney, Agent, or Firm* — Weisberg I.P. Law, P.A.

(57) ABSTRACT

A computer implemented method performed by a node in a communications network for scheduling transmissions of a plurality of Internet of Things (IoT) devices to network resources in the communications network includes obtaining transmission patterns for the IoT devices. The method then includes clustering the IoT devices into clusters based on the obtained transmission patterns. The method then includes scheduling transmissions of IoT devices in different clusters to different network resources, thereby increasing synchronisation of the transmissions scheduled on each network resource and allowing for increased periods of inactivity of the network resources between transmissions.

18 Claims, 8 Drawing Sheets

(56) References Cited

U.S. PATENT DOCUMENTS

| | | | | |
|---|---|---|---|---|
| 2010/0042716 | A1 | 2/2010 | Farajidana et al. | |
| 2011/0103248 | A1* | 5/2011 | Le Houerou | H04W 72/541 370/252 |
| 2014/0086157 | A1* | 3/2014 | Bontu | H04W 52/383 370/328 |
| 2015/0215099 | A1* | 7/2015 | Tie | H04B 17/336 370/329 |
| 2015/0296560 | A1* | 10/2015 | Sadek | H04W 76/28 370/336 |
| 2015/0382315 | A1 | 12/2015 | Sorrentino et al. | |
| 2016/0286601 | A1* | 9/2016 | Siomina | H04W 76/28 |
| 2017/0142741 | A1* | 5/2017 | Kaur | H04W 72/121 |
| 2017/0245155 | A1* | 8/2017 | Wang | H04W 72/02 |
| 2018/0213493 | A1* | 7/2018 | Chakraborty | H04J 11/0053 |
| 2018/0302895 | A1* | 10/2018 | Akkarakaran | H04L 5/0094 |
| 2018/0368149 | A1* | 12/2018 | Raghavan | H04W 72/541 |
| 2019/0068350 | A1 | 2/2019 | Brown et al. | |
| 2019/0116599 | A1* | 4/2019 | Xue | H04L 5/0035 |
| 2019/0141146 | A1* | 5/2019 | Abdala | G06N 3/08 |
| 2019/0182846 | A1* | 6/2019 | Chung | H04W 72/542 |
| 2019/0363843 | A1* | 11/2019 | Gordaychik | H04W 72/044 |
| 2019/0372345 | A1* | 12/2019 | Bain | H02J 3/008 |
| 2020/0193155 | A1* | 6/2020 | Keohane | G06N 5/046 |
| 2022/0007304 | A1* | 1/2022 | Haghighat | H04W 52/34 |
| 2022/0103293 | A1* | 3/2022 | Moilanen | H04L 1/08 |
| 2022/0182200 | A1* | 6/2022 | Qi | H04W 72/044 |
| 2022/0191875 | A1* | 6/2022 | Panteleev | H04W 72/0453 |
| 2022/0295324 | A1* | 9/2022 | Pantelidou | H04W 24/08 |
| 2024/0015726 | A1* | 1/2024 | Eleftheriadis | H04W 72/121 |

OTHER PUBLICATIONS

Pan, Hui-ping; "Design and Improvement of Cloud Scheduling Platform in Optical Fiber Internet of Things"; Laser Journal (vol. 38, No. 1), pp. 135-139, 2017, consisting of 5 pages.

International Search Report and Written Opinion dated Jun. 9, 2021 for International Application No. PCT/EP2020/075520 filed Sep. 11, 2020, consisting of 9 pages.

Chinese Office Action and English Summary dated Jun. 23, 2025 for Application No. 202080104938.1, consisting of 14 pages.

* cited by examiner

SCHEDULING TRANSMISSIONS OF INTERNET OF THINGS DEVICES

CROSS-REFERENCE TO RELATED APPLICATION

This application is a Submission Under 35 U.S.C. § 371 for U.S. National Stage Patent Application of International Application Number: PCT/EP2020/075520, filed Sep. 11, 2020 entitled "SCHEDULING TRANSMISSIONS OF INTERNET OF THINGS DEVICES," the entirety of which is incorporated herein by reference.

TECHNICAL FIELD

This disclosure relates to methods, nodes and systems in a communications network. More particularly but non-exclusively, the disclosure relates to scheduling transmissions of a plurality of Internet of Things (IoT) devices to network resources in a communications network.

BACKGROUND

The adoption of Internet of Things (IoT) technology is increasing rapidly for many industries, such as the manufacturing, automotive and healthcare industries. As a result, future communications networks (e.g. mobile networks) will contain many different types of connected IoT devices with different requirements on the network, such as Category-M (CAT-M) or narrowband IoT (NB-IoT). Different types of connected IoT devices with different network requirements can result in a range of different Service Level Agreement (SLA) requirements for different IoT devices on the communications network.

FIG. 1 shows that, dependent on the technology, the IoT carrier can be allowed to operate, on inbound, guard band or at a stand alone position, within the spectrum. For example in Cat-M 102, devices 104, 106 may operate in-band 108. For NB-IoT 110, devices may operate in standalone bands 112, 114 for GSM (Global System for Mobile Communications), in a guard band 118 for LTE (Long Term Evolution networks) 116 or within 122 an LTE band 120.

Some IoT devices make short periodic transmissions with particular transmission patterns. The communications network needs to be able to schedule these transmission alongside "normal" transmissions associated with User Equipments (UEs).

As communications networks expand, power saving becomes increasingly important. Embodiments herein relate to scheduling transmissions of a plurality of IoT devices in a communications network in an energy efficient manner for the network resources.

SUMMARY

One way to save energy in a communications network is to turn off (or put into a sleep state) network resources when they are not needed. If there are many IoT devices in different deployments, as in FIG. 1, with different properties (e.g. frequency, transmission time) that regularly need to transmit, it becomes increasingly difficult to find time periods in which no transmissions need to be made and the network resources can be turned off. This can reduce the number of periods in which the network resource may be put into sleep mode and/or reduce the length of such periods, leading to "less deep" sleep states and lower energy savings.

It is an object of embodiments herein to provide improved scheduling of IoT transmissions, with a view to increasing energy efficiency in a communications network.

Thus in a first aspect there is a computer implemented method performed by a node in a communications network for scheduling transmissions of a plurality of Internet of Things (IoT) devices to network resources in the communications network. The method comprises i) obtaining transmission patterns of transmissions from the IoT devices, ii) clustering the IoT devices into clusters based on similarily of the obtained transmission patterns, and iii) scheduling transmissions of IoT devices in different clusters to different network resources, thereby increasing synchronisation of the transmissions scheduled on each network resource and allowing for increased periods of inactivity of the network resources between transmissions.

In some embodiments, the method further comprises selecting new transmission patterns for the IoT devices, wherein the new transmission patterns are predicted to result in clustering with increased synchronisation of the transmission patterns of the IoT devices in the clusters, and repeating steps ii) and iii) for the new transmission patterns.

According to a second aspect there is a node in a communications network for scheduling transmissions of a plurality of Internet of Things (IoT) devices to network resources in the communications network. The node comprises a memory comprising instruction data representing a set of instructions, and a processor configured to communicate with the memory and to execute the set of instructions. The set of instructions, when executed by the processor, cause the processor to: i) obtain transmission patterns for transmissions from the IoT devices; ii) cluster the IoT devices into clusters based on the obtained transmission patterns, and iii) schedule transmissions of IoT devices in different clusters to different network resources, thereby increasing synchronisation of the transmissions scheduled on each network resource and allowing for increased periods of inactivity of each respective network resource between transmissions.

According to a third aspect there is a computer program comprising instructions which, when executed on at least one processor, cause the at least one processor to carry out a method according to the first aspect.

According to a fourth aspect there is a carrier containing a computer program according to the third aspect, wherein the carrier comprises one of an electronic signal, optical signal, radio signal or computer readable storage medium.

According to a fifth aspect there is a computer program product comprising non transitory computer readable media having stored thereon a computer program according to the third aspect.

Embodiments herein enable transmissions from IoT devices to be better grouped and synchronised on each network resource, leading to increased periods of inactivity whereby the network resources may be turned off, thus saving energy. By modelling and synchronizing the time aspects of when the different clusters transmit data, the systems herein can optimize and predict when the radio or radio technologies can be turned off or put into a sleep mode without impacting SLA or quality of service.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

Figure 1:
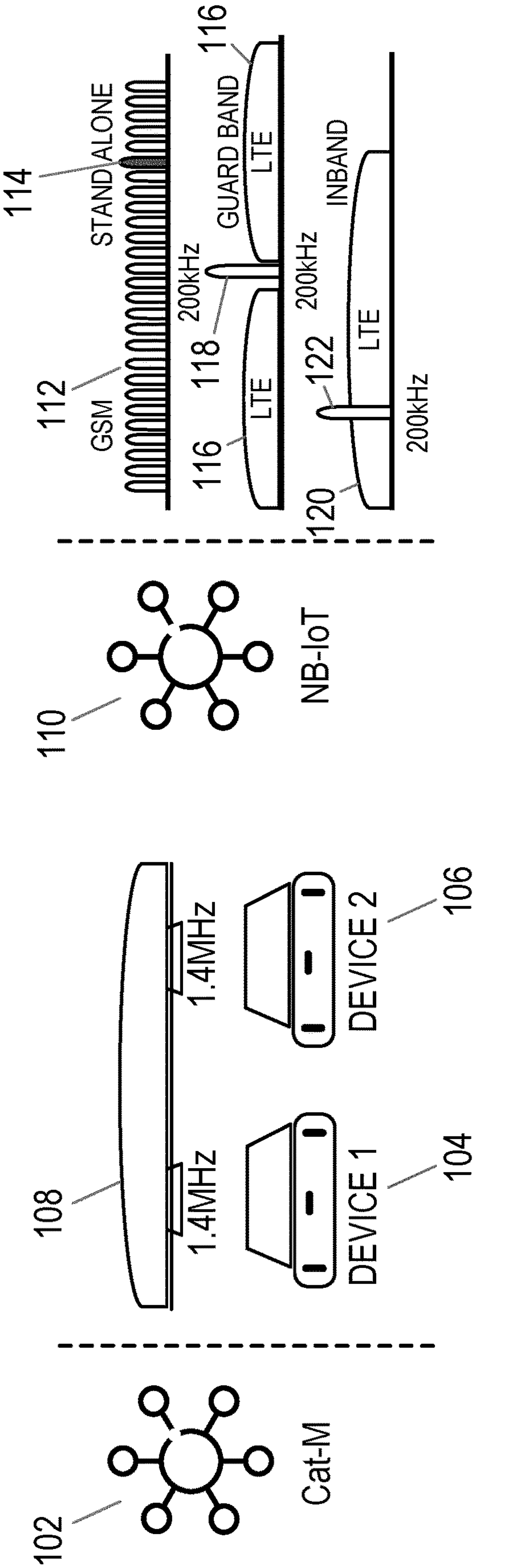
FIG. 1 illustrates various transmission bands and protocols associated with IoT devices.
Figure 2A:
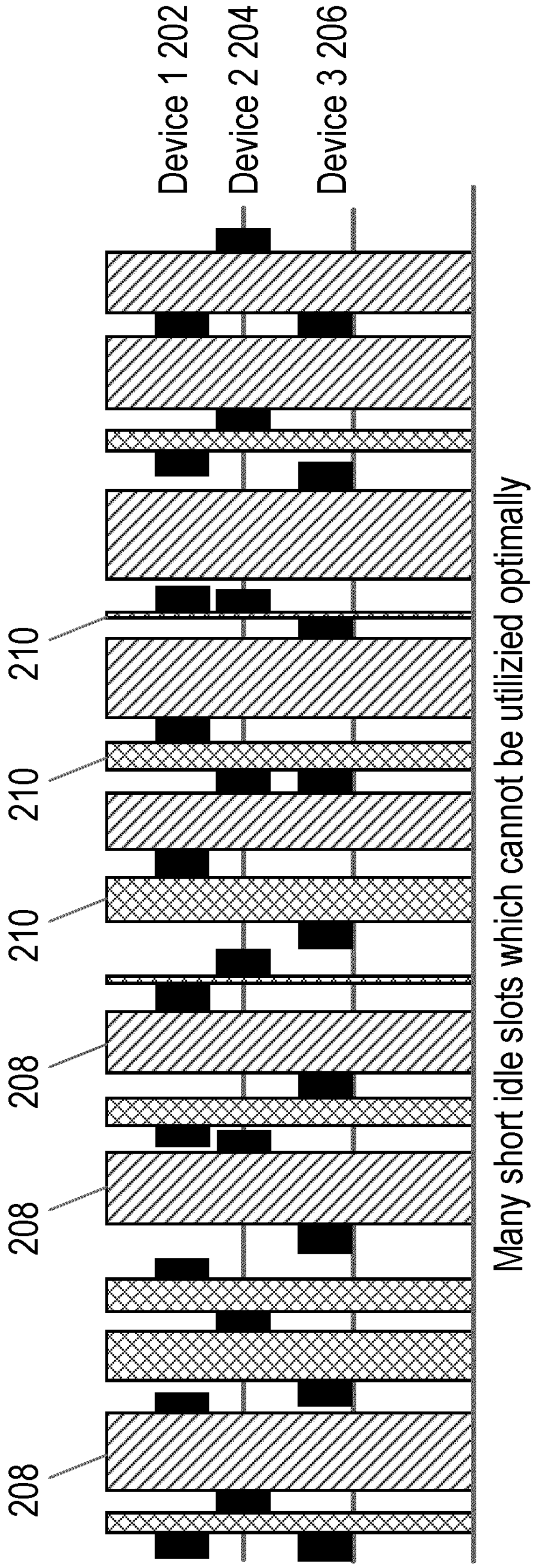
FIGS. 2a and 2b illustrate how resources may be scheduled according embodiments herein.

The disclosure herein relates to scheduling transmissions of IoT devices on network resources in a manner than results in energy savings of the network resources. Example transmission patterns of three IoT devices 202, 204 and 206 are illustrated in FIG. 2a (top middle and bottom rows respectively) over time (x-axis). Vertical slots 208 (hatched slots) indicate periods of inactivity where the network resource servicing the devices 202, 204 and 206 can be put into a sleep mode to save energy. Slots 210 (cross-hatched vertical slots) indicate shorter periods of inactivity where the slot may be too short to put the resource into a "deep" sleep state; in some cases it may be too short to put the resource into a sleep state at all. For example, in LTE networks, a transmission subframe is 1 ms and sleep durations are in milliseconds. For New Radio (NR), sleep slots may be less than 100 microseconds. For deeper sleep states (e.g. turning equipment off or locking a cell) it may take up to 3 minutes to turn a cell on. Thus the energy saving may be less in these periods. Generally, the transmission patterns result in many short idle slots which cannot be utilised optimally. It is an object of embodiments herein to schedule the transmissions of IoT devices in a manner which allows for increased periods of inactivity and periods of inactivity of longer duration. This allows for increased energy savings.

In more detail, the disclosure herein relates to a communications network (or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 3:
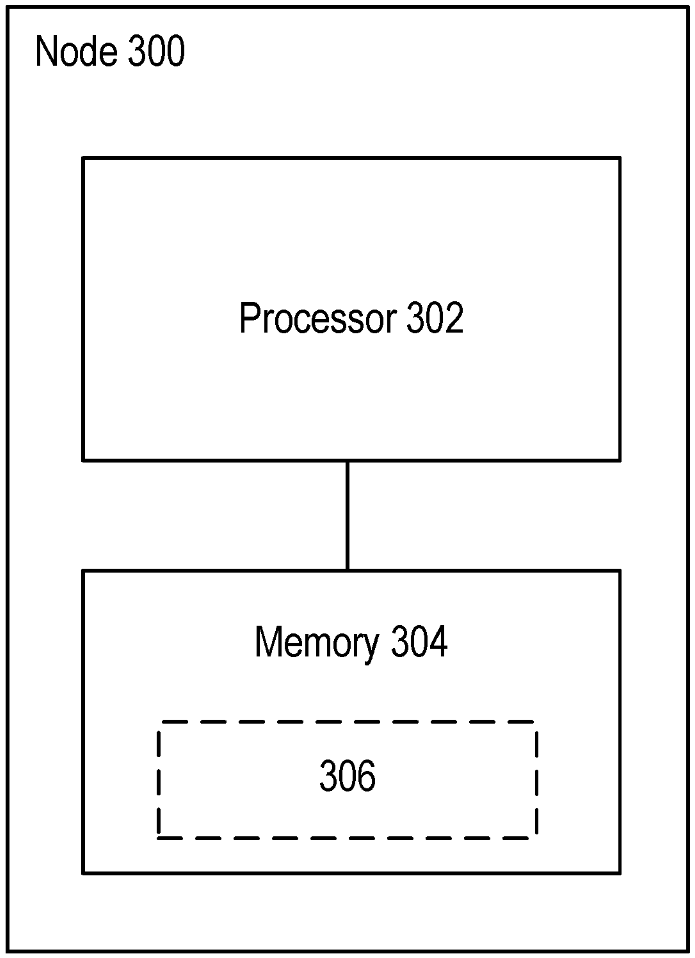
FIG. 3 illustrates a node according to some embodiments herein.

FIG. 3 illustrates a network node 300 in a communications network according to some embodiments herein. Generally, the node 300 may comprise any component or network function (e.g. any hardware or software module) in the communications network suitable for performing the functions described herein. For example, a node may comprise equipment capable, configured, arranged and/or operable to communicate directly or indirectly with an IoT device or UE (such as a wireless device) and/or with other network nodes or equipment in the communications network to enable and/or provide wireless or wired access to the IoT device or UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 300 is configured (e.g. adapted, operative, or programmed) to perform any of the embodiments of the method 400 as described below. It will be appreciated that the node 300 may comprise one or more virtual machines running different software and/or processes. The node 300 may therefore comprise one or more servers, switches and/or storage devices and/or may comprise cloud computing infrastructure or infrastructure configured to perform in a distributed manner, that runs the software and/or processes.

The node 300 may comprise a processor (e.g. processing circuitry or logic) 302. The processor 302 may control the operation of the node 300 in the manner described herein. The processor 302 can comprise one or more processors, processing units, multi-core processors or modules that are configured or programmed to control the node 300 in the manner described herein. In particular implementations, the processor 302 can comprise a plurality of software and/or hardware modules that are each configured to perform, or are for performing, individual or multiple steps of the functionality of the node 300 as described herein.

The node 300 may comprise a memory 304. In some embodiments, the memory 304 of the node 300 can be configured to store program code or instructions 306 that can be executed by the processor 302 of the node 300 to perform the functionality described herein. Alternatively or in addition, the memory 304 of the node 300, can be configured to store any requests, resources, information, data, signals, or similar that are described herein. The processor 302 of the node 300 may be configured to control the memory 304 of the node 300 to store any requests, resources, information, data, signals, or similar that are described herein.

It will be appreciated that the node 300 may comprise other components in addition or alternatively to those indicated in FIG. 3. For example, in some embodiments, the node 300 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 302 of node 300 may be configured to control such a communications interface to transmit to and/or receive from other nodes or network functions requests, resources, information, data, signals, or similar.

Briefly, in one embodiment, the node 300 is for scheduling transmissions of a plurality of Internet of Things (IoT) devices to network resources in a communications network. The node 300 is configured to: i) obtain transmission patterns of transmissions from the IoT devices; ii) cluster the IoT devices into clusters based on the obtained transmission patterns; and iii) schedule transmissions of IoT devices in different clusters to different network resources, thereby increasing synchronisation of the transmissions scheduled on each network resource and allowing for increased periods of inactivity of each respective network resource between transmissions.

Figure 4:
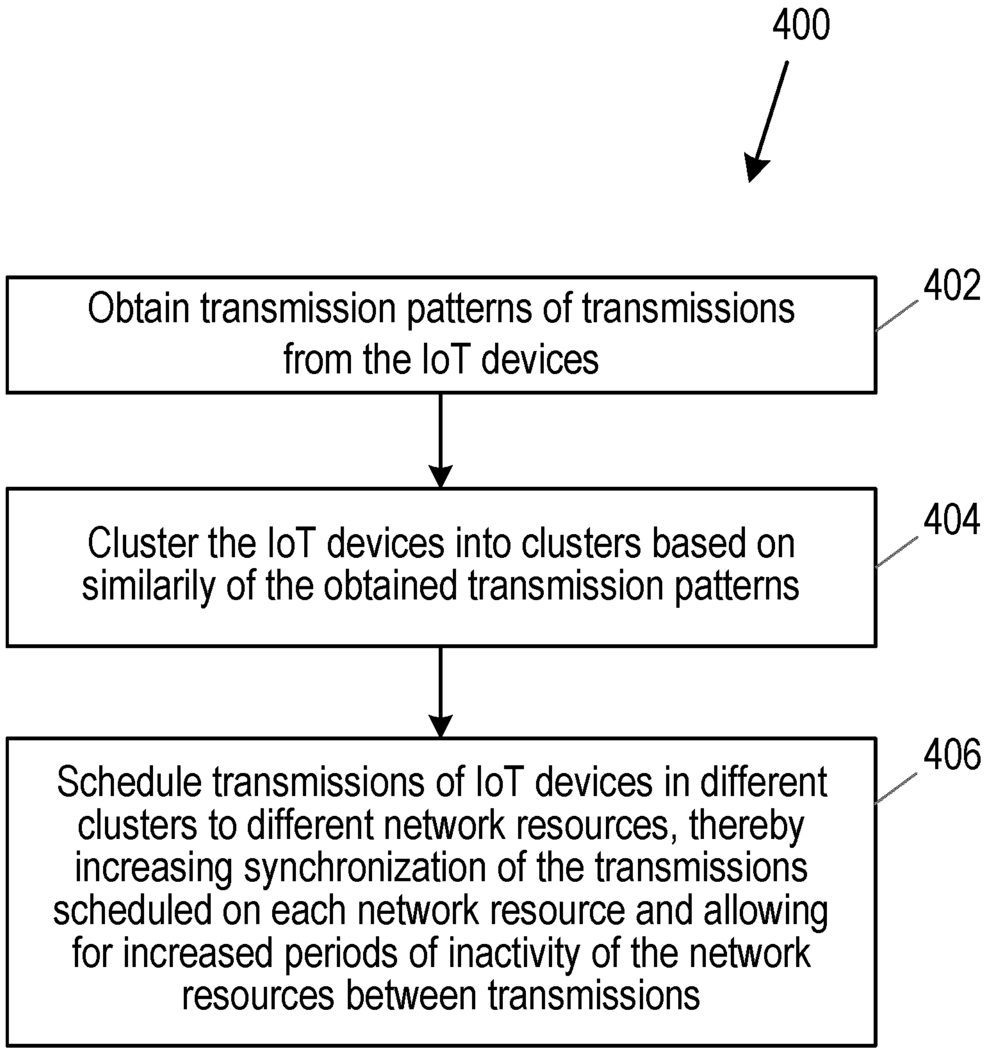
FIG. 4 illustrates a method according to some embodiments herein.

Turning now to FIG. 4, there is a computer implemented method 400 performed by a node in a communications network. The method is for scheduling transmissions of a plurality of Internet of Things (IoT) devices to network resources in the communications network. The method may be performed by a node in the communications network, for example, such as the node 300 described above.

Briefly, in a first step 402 the method comprises i) obtaining transmission patterns of transmissions from the IoT devices. In a second step 404 the method comprises ii) clustering the IoT devices into clusters based on the obtained transmission patterns. In a third step the method comprises iii) scheduling transmissions of IoT devices in different clusters to different network resources, thereby increasing synchronisation of the transmissions scheduled on each network resource and allowing for increased periods of inactivity of the network resources between transmissions.

As noted above, scheduling transmissions in this manner may lead to more periods of inactivity between transmissions and thus more opportunity for the network resources to be turned off or put into a sleep state. Furthermore the periods of inactivity may be longer in duration, thus enabling the network resources to be put into "deeper" sleep. This leads to energy saving in the network resource. For reference, different sleep states are described in Annex 1.

In more detail, an IoT device may comprise a device capable, configured, arranged and/or operable to communicate wirelessly with network nodes and/or other wireless devices. Internet of Things (IoT) devices may represent machines or other devices that perform monitoring and/or measurements, and transmit the results of such monitoring and/or measurements to other User Equipments (UEs) and/or a network nodes. An IoT device may comprise a machine-to-machine (M2M) device, which may in a 3GPP context be referred to as an MTC device. As one particular example, the IoT device may be a device implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, an IoT device may represent a vehicle or other equipment that is capable of monitoring and/or reporting on its operational status or other functions associated with its operation. In another scenario an IoT device may initiate real-time streaming of video.

Some embodiments herein describe User Equipments (UEs). As used herein, a UE may comprise a device capable, configured, arranged and/or operable to communicate wirelessly with network nodes and/or other wireless devices. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

The type of device may be determined, for example based on International Mobile Subscriber Identity (IMSI) or by a header in the communication stack.

As noted above, in step 402 the method comprises i) obtaining transmission patterns (e.g. network access patterns) for the IoT devices.

The transmission patterns can be periodic, e.g. periodic reports from sensors (such as temperature sensors, weather sensors), equipment status updates (e.g. in factory equipment monitoring), or any other type of periodic transmissions.

Step 402 may further comprise obtaining transmission parameters associated with the transmission patterns. For example, transmission parameters may comprise, for example, frequency or timing information of the transmissions. The transmission patterns may be associated with service level agreements (SLAs) of the IoT devices.

The transmission patterns and/or transmission parameters may be obtained for example, from another node in the communications network such as a Service Capability Exposure Function SCEF in a 5G network. This is merely an example however and the skilled person will appreciate that the transmission patterns may be obtained from any other node in the communications network, e.g. with similar functionality to an SCEF.

In step 404 the method comprises ii) clustering the IoT devices into clusters based on the obtained transmission patterns. Clustering may be based on how similar the transmission patterns are and may be performed using known clustering techniques such as k-means. Clustering may further be performed according to IoT device SLA, transmission patterns (e.g. network access patterns), coverage area, data rates and criticality of the device. Examples of critical devices are, for example, medical devices that have a clear time critical aspect of data transmission that cannot be interrupted and automated vehicles. In one example, clustering is performed (or clusters are defined) according to whether it is possible to negotiate a common transmission pattern for the devices in the cluster.

The type of clustering process performed may depend on the input parameters and/or implementation design. For example, in an embodiment where device location is used as a parameter with which to perform the clustering, clustering may be performed using Density-Based Spatial Clustering of Applications with Noise (DBSCAN). In another embodiment, the problem may be formulated as a graph, in which case affinity propagation may be used. If we are interested in certain variance, Principal Component Analysis, PCA can be used to identify principal components (i.e. the properties of interesting transmission control parameters). Chameleon or other hierarchical clustering techniques can be used if we want to have more general clusters that over time become more specific to certain traits (e.g. class of IoT devices, location, frequency of transmission, energy etc). The skilled person will appreciate however that these are merely examples and that other clustering techniques may also be used.

In step 406, the transmissions of IoT devices in different clusters are scheduled to (e.g. allocated to be serviced by) different network resources. In other words, the transmissions of IoT devices are allocated to the network resources according to the clusters. For example, different clusters of IoT devices may be scheduled to be serviced by different network resources (e.g. different base stations, or different cells on a base station). Put another way, each network resource may service IoT devices from the same cluster (or two or more similar clusters). It will be appreciated that in a practical application, a large cluster of IoT devices may be split and allocated to two or more network resources. By grouping transmissions from the IoT devices in this way, the transmissions can be better synchronised leading to increased periods of inactivity where the network resources may be put into a sleep mode (e.g. turned off), thus saving energy.

Figure 2B:
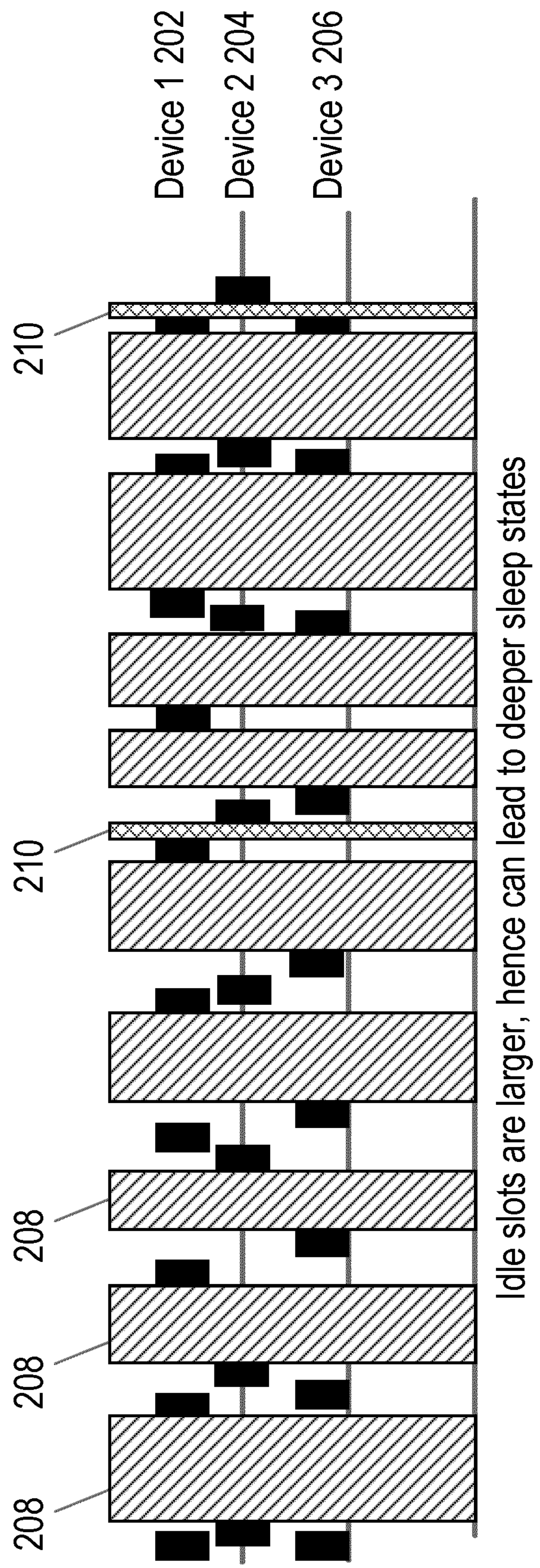

This is illustrated in FIG. 2*b* which shows transmission patterns of the devices 202, 204 and 206 after scheduling according to the methods herein. The transmissions are grouped leading to larger inactive slots 210 which enables longer periods of sleep. Furthermore, longer periods of inactivity enable "deeper" sleep states for the network resources and thus further energy savings. Slots less than a particular duration cannot be used for sleep because they are not sufficient for wakeup. It can be seen (e.g. compared to FIG. 2*a*) that clustering of transmission patterns lead to increased sleep durations.

Further energy saving may be made by improving the clustering (and thus synchronisation) of the IoT devices in each cluster. This may be achieved by suggesting new transmission patterns for the IoT devices. As will be described in more detail below, new transmission patterns may be suggested in an iterative manner, until optimal transmission patterns are found that result in the greatest energy savings.

Generally therefore, the method 400 may further comprise selecting new transmission patterns for the IoT devices. Generally the new transmission patterns are predicted to result in clustering with increased synchronisation (e.g. compared to the transmission patterns obtained in step i)) of the transmission patterns of the IoT devices in the clusters. The method may then comprise repeating steps ii) and iii) described above for the new transmission patterns.

The new transmission patterns may be chosen so as to reduce the number of clusters and/or increase the similarity of the transmission patterns in each cluster.

Some IoT devices may have flexibility associated with their transmission patterns. The flexibility may be with regards to, for example, timing, or the frequency at which the transmissions are made. The flexibility with which an IoT device is permitted to make its transmissions may depend on the service level agreement (SLA) for the IoT device. Critical IoT devices (e.g. such as those associated with medical applications, or automated vehicles) may have little flexibility in their transmission patterns. As an example, a SLA may describe latency and reliability requirements. For the critical devices a SLA may, for example, stipulate from 10 s-1 s of ms latency and 99%-99.999% reliability. Other IoT devices (reporting e.g. sensor readings for weather applications) may have considerably more flexibility. SLAs may further stipulate different requirements for different times of day, or different applications.

Thus, the new transmission patterns can comprise perturbations (e.g. variations) of the transmission patterns obtained in step i), the perturbations being based on predetermined flexibilities associated with the transmission patterns of the IoT devices. In other words, new transmission patterns may be selected, by adjusting the transmission patterns obtained in step i) within the bounds of the predetermined flexibilities (such as the constraints imposed by the service level agreements of the IoT devices).

Other factors may also be considered when selecting the new transmission patterns. For example, a network resource may be servicing other traffic, such as UE traffic which may be inflexible (or less flexible) in its scheduling (e.g. traffic due to calls, data streaming and the like). In such circumstances, IoT traffic may be scheduled (using the predetermined flexibilities) so as to overlap with the UE traffic and thus enable increased periods of inactivity of the network resource. Thus in some embodiments, the method 400 may comprise obtaining transmission patterns for one or more User Equipments (UEs) that are making transmissions using the network resources. The step of selecting new transmission patterns for the IoT devices may then further comprise selecting new transmission patterns for the IoT devices so as to increase a measure of overlap (e.g. in time/when the transmission occur) between the transmission patterns of the IoT devices and the transmission patterns of the one or more UEs. In this way, flexibility in IoT transmission patterns may be leveraged so as to improve overlap between the IoT transmissions and the less flexible (or fixed) UE transmission patterns, thus resulting in increased energy savings.

The new transmission patterns must be accepted by the IoT devices and the application(s) running on said IoT devices. Thus in some embodiments, the method 400 may comprise negotiating with the IoT devices to determine whether the new transmission patterns satisfy performance requirements of the IoT devices. E.g. a negotiation may occur to establish whether the new transmission patterns satisfy a SLA associated with the IoT device. For example, a negotiation may be performed by sending a message (e.g. from a module responsible for the negotiation) comprising the proposed parameters to an SCEF and/or application manager. In one embodiment, the message may comprise a prioritized list of possible intervals of transmission. In this example, the response from the SCEF and/or application may comprise an indication of which interval from the list is acceptable. Each IoT device may send back an acknowledgement and acceptance for the specific device, and also interact with network components such as the Management Data Analytics Service, MDAF, to check the feasibility of the suggested transmission pattern.

The use of clustering in combination with negotiation in the manner described above, allows optimization and synchronization and batching of data transmission patterns from IoT devices, without risk of impact on SLA or quality of service to the IoT devices.

As noted above, in some embodiments, the new transmission patterns can be selected among perturbed transmission patterns for each device, e.g. using the transmission pattern and permitted flexibility in said transmission pattern.

As an alternative, machine learning can be used to select the new transmission patterns for the IoT devices. For example, the method can comprise using a model trained using a machine learning process to select the new transmission patterns. Such a model may take as input transmission parameters of the IoT devices, and output the new transmission patterns for the IoT devices, based on the transmission parameters.

The skilled person will be familiar with machine learning and models that can be trained using machine learning processes. A machine learning process, may be defined as a procedure that is run on data to create a machine learning model. The machine learning processes comprises algorithmic steps and/or instructions through which data, generally referred to as training data, may be processed or used in a training process to generate a machine learning model. The process learns or updates the model from the training data.

There are many machine learning processes, including supervised, unsupervised and reinforcement learning (RL) process. Supervised processes include, for example, processes for classification, such as k-nearest neighbours, processes for regression, such as linear regression or logistic regression, and processes for clustering, such as k-means. Further examples of machine learning processes are Decision Tree algorithms and Artificial Neural Network algorithms. Machine learning processes can be implemented with any one of a range of programming languages.

The model, or machine learning model, may comprise both data and procedures for how to use the data to e.g. make a prediction, perform a specific task or for representing a real world process or system. The model represents what was learned by a machine learning process when trained by using the training data, or put another way, what is generated from a machine learning process. The model may represent e.g. rules, numbers, and any other algorithm-specific data structures or architecture required to e.g. make predictions.

A model as used herein may also refer to a reinforcement learning agent, and the machine learning process may comprise a reinforcement learning process. Examples of reinforcement learning processes include but are not limited to Q-learning or SARSA (state-action-reward-state-action) processes. Reinforcement learning agents learn by performing actions (e.g. in this context suggesting new transmission patterns) and receiving feedback in the form of "rewards" based on the outcome/effects of their actions. Reinforcement learning agents explore an action space comprising all possible actions in order to receive rewards and determine optimal actions in different scenarios (or states).

These are merely examples however and generally, any model may be used that can be trained to take as input the parameters described herein and output a prediction of a new transmission pattern.

The model may trained to output transmission patterns for the IoT devices that optimise a number of clusters obtained when clustering the IoT devices in step (ii) and/or that are predicted to satisfy performance requirements of the IoT devices e.g. and thus lead to successful negotiations between the node and the IoT device.

The model may take as input transmission parameters comprising one or more of: the transmission patterns obtained in step i) the flexibility associated with the transmission patterns obtained in step i), service level agreements, a time of day, and/or locations of the IoT devices. The model may then output, based on these transmission parameters, new transmission patterns for the IoT devices.

The model may be used to learn the optimal clustering of possible transmission patterns of the IoT devices attached to a cell. As noted above, the space of all possible transmission patterns is dependent upon the flexibility of the application SLAs <frequency, jitter tolerance, bandwidth> and device capabilities. For example, an application may be able to function properly either when (1) more frequent access is granted with a small amount data per access or when (2) less frequent access is granted with a larger amount of data per access. This flexibility can be exploited to generate the input space for clustering.

Further, the flexibilities may be dynamic: applications can have different flexibilities at different times of the day, for example, more frequent video data sampling in the evening than during the day; flexibilities of devices may change due to firmware updates, and also due to mobility of devices that may enter or exit the cell. Therefore, the available space of transmission patterns can change, and optimal clustering is to be found to the extent possible at any given point of time.

Generally, the model is expected to suggest patterns that improve the clustering and/or are likely to be accepted by the IoT devices and applications. By "improved clustering", the model may predict or select new transmission patterns for each IoT device that results in clusters that both increase to total time and the duration of each time period where energy saving actions can be used. Longer time periods enable deeper sleep states which further increase the energy savings. Thus transmission patterns may be chosen that increase synchronisation of the transmission patterns of the IoT devices in each cluster, e.g. compared to the transmission patterns obtained in step i).

In terms of predicting patterns that are likely to be accepted by the IoT devices, the model may learn from past experiences, for example, that in the evenings, low frequency access is not acceptable by a surveillance application. Therefore, it will not suggest transmission patterns with low frequency pattern for this particular device in the evening.

The ML model can take <device transmission patterns, application SLAs, time, location> as input state, suggests a new device transmission pattern, the predicted negotiation result and the predicted energy saving, E_s, corresponding to the clustering and allocation of clusters to radio resources. In the training phase it can explore the solution space of transmission patterns. In the inference phase, it outputs the best solution available.

In one example, the model is a reinforcement learning (RL) model. Inputs to the model are acceptability of the proposed clustering (e.g. from a module performing a negotiation on the new transmission patterns) and the resultant energy savings (from monitoring the network resources).

Generally, since the input of this model is of varying size (due to varying devices and applications), a canonical representation of the input may be required. This can be achieved by fixing upper bounds on the numbers of devices and applications and replacing the unavailable slots with dummy transmission patterns and SLAs. Machine learning based on knowledge graphs encoding the transmission patterns and SLA's could be used.

The set of new transmission patterns will be now be less in number than the original set of transmission patterns obtained in step i) leading to increased sleep durations. Evidently, the fewer number of clusters, the greater the periods of inactivity and the greater energy saving that may be made. For a given window of time T and a set of clusters C, we can compute the sleep durations (SD) allowed by the cluster. The sleep mode slabs for the network resources are then used to compute the possible saving in energy E_S, due to SD (larger sleep duration→deeper sleep mode→larger saving). We take E_S(C) as a measure of the quality of the clustering of the transmission patterns of the plurality of IoT devices in a cell.

Further, given a set of radio resources R1, . . . Rn, one could partition the set of clusters C into C1, . . . , Cn, and assign Ci to Ri. It is easy to see that this increases the total sleep durations i.e. $\Sigma$SD(C_i)≥SD(C) and hence the total E_S(C1, . . . C_n).

Feedback on the clustering, energy savings and results of the negotiations may be fed back to the model in order that the model may learn from its predictions. The method may therefore further comprise steps of providing a first feedback to the model based on the clusters, and re-training the model, using the first feedback, to output transmission patterns that increase synchronisation of the transmissions scheduled on each network resource. For example, the first feedback can comprise a measure of energy usage associated with the network resources performing the scheduled transmissions in step iii). It may comprise a measure of an energy saving associated with the periods of inactivity of the network resources. For example, the energy saved (or conversely used) when transmissions from the IoT devices were scheduled according to the new transmission patterns, and clusters, predicted by the model.

The method may additionally or alternatively comprise providing a second feedback to the model based on an outcome of the step of negotiating, and re-training the model, using the second feedback, to output transmission patterns for the IoT devices that satisfy the performance requirements of the IoT devices. For example, the outcome of the step of negotiating (described above) may be provided to the model for the IoT devices (e.g. each IoT device).

The first feedback and the second feedback will take different forms dependent on the type of model. For example, if the model comprises a RL model then the RL agent may receive positive rewards for predicting transmission patterns that lead to improved clustering (and thus improved energy savings of the network resources), and/or acceptance by the IoT devices. As a non-limiting example, a reward scheme for a may be set up so as to penalise (e.g. provide a negative reward) if a new transmission for an IoT device is not accepted by the respective IoT device, or if the new transmission pattern results in less energy being saved compared to a previous transmission pattern. Positive rewards may be given if a new transmission pattern for an IoT device (or a set of patterns for a respective set of IoT devices) improves the clustering, and/or if a new transmission pattern results is accepted by the IoT device.

As another example, if the model comprises a supervised learning model such as a neural network, then the first feedback and/or the second feedback may comprise a ground truth (e.g. observed) indication of whether the new transmission patterns resulted in good clustering, energy savings in the network resources and/or successful negotiation. The skilled person will appreciate that this is merely an example and that the feedback may take other forms dependent on the type of model and its architecture.

Generally, the method may then comprise repeating steps ii) and iii) using the re-trained model.

The success (or failure) of the step of negotiating described above can further be used to trigger another new set of transmission patterns to be predicted by the model, resulting in a new clustering. This creates a back and forth loop between the negotiation and clustering steps where the goal is to maximize the time periods in which energy saving actions can be used, whilst ensuring the new transmissions are accepted and thus satisfy SLA requirements of the IoT device.

Figure 5:
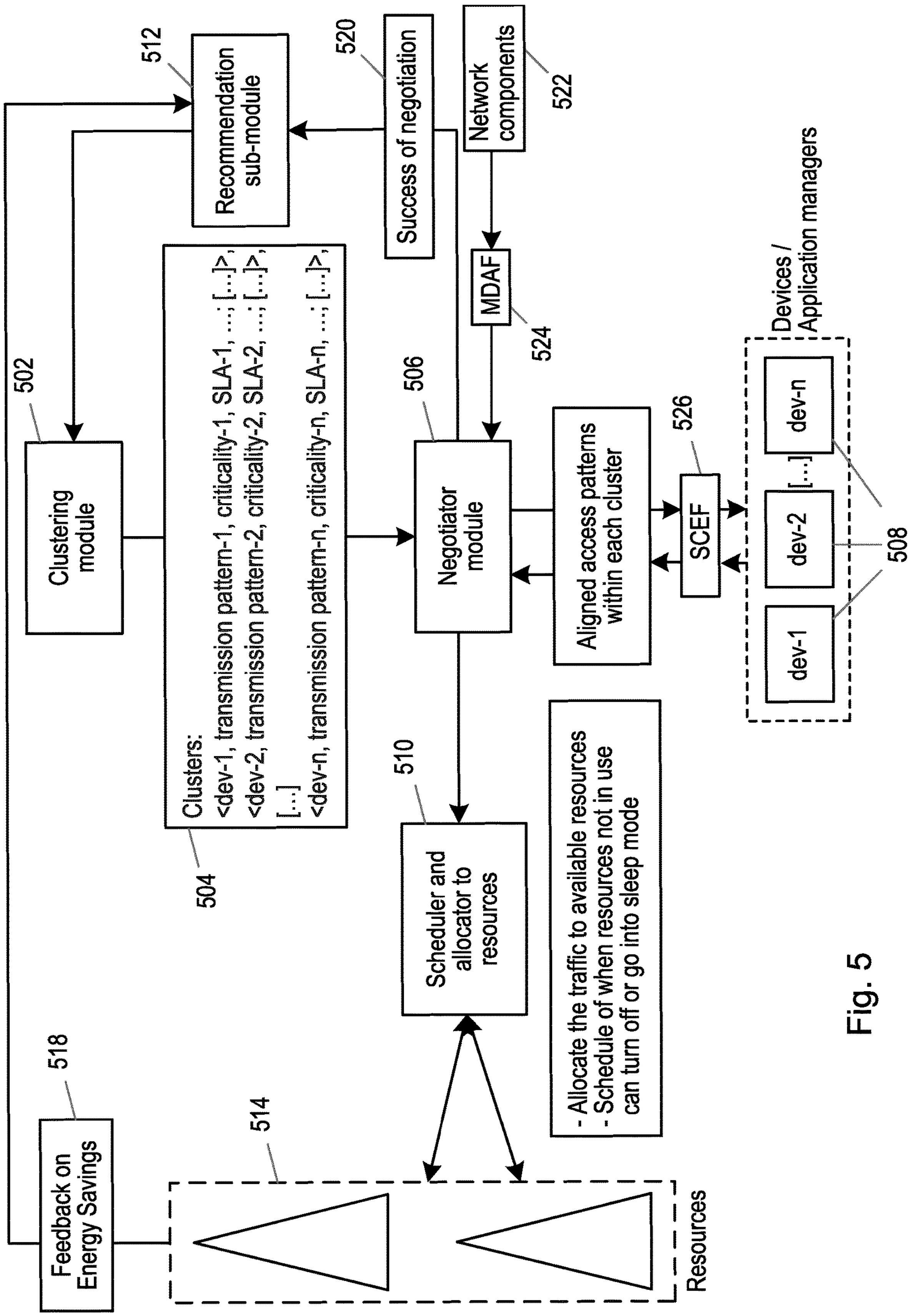
FIG. 5 illustrates a system according to an example herein.

Turning now to FIG. 5 which shows an example system architecture whereby the steps of the method 400 are performed by different (computer implemented) modules. The modules may all be part of the same node, such as the node 300 described above. Alternatively, one or more of the nodes could be located in different nodes. Alternatively still, one or more of the nodes could be implemented in the cloud. Alternatively still, one or more modules (such as the Negotiator module 506) may be located in the edge (e.g. a base station). It will be appreciated that this is an example architecture only and that other arrangements are possible.

In the example of FIG. 5, a clustering module 502 obtains 402 transmission patterns for a plurality of IoT devices and clusters 404 the IoT devices into clusters based on the obtained transmission patterns. These steps were described in detail above and the detail therein will be understood to apply equally to the functionality of the clustering module 502. The clustering module 502 outputs the clusters 504. The output of the clustering module can comprise, for example, fields such as: an IoT device identifier, an identifier associated with a SLA for the IoT device for each IoT device, an access/transmission pattern of the IoT device and an indication of the criticality of the IoT device.

In this example, the cluster information is sent to a Negotiator Module 506 that negotiates with the IoT devices 508 and/or application managers for the IoT devices such as a Service Capabilities Exposure Function 526, to determine whether this clustering is ok according to (e.g. in compliance with) the SLAs of the IoT devices. The access patterns (e.g transmission patterns) are aligned within each cluster.

The Negotiator module 506 may also take input from Network components 522, e.g. Hardware and software components that may be configured. Such information may be provided by a Management and Orchestration Data Analytics Function (MDAF) 524.

Successful negotiation outcomes are forwarded to a Scheduler and Allocator 510. The Scheduler and Allocator 510 schedules 406 transmissions of the IoT devices in different clusters to different network resources 514 (e.g. schedules the transmissions according to the clusters). The transmissions are performed and a measure of energy usage is determined. As described above, a measure of energy usage could be an energy saving due to periods of inactivity between the transmissions of the network resources.

A first feedback 518 related to the energy usage is determined and fed to a Recommendation sub-module 512. A second feedback 520 related to the success of the negotiation performed by the Negotiator Module 506 is also fed back to the recommendation sub-module 512.

The Recommendation sub-module 512 selects new transmission patterns for the IoT devices. The new transmission patterns are predicted to result in clustering with increased synchronisation of the transmission patterns of the IoT devices in the clusters. The recommendation module 512 predicts the new transmission patterns using a model trained using a machine learning process. The model is trained to output transmission patterns for the IoT devices that optimise a number of clusters obtained by the clustering module 502 and/or that are predicted to satisfy performance requirements of the IoT devices and thus result in successful negotiations by the negotiator module 506.

As described above, the model in the Recommendation sub-module selects a candidate transmission pattern which is different from the current transmission pattern (which resulted in a current clustering), based on the allowed flexibilities associated with the transmission patterns of the IoT devices in the cell and the network capabilities to support the latency and bandwidth requirements of the transmission patterns. The ML model is expected to suggest patterns that improve the clustering and are likely to be accepted by the devices and applications (based on learning from the first and second feedbacks). The first feedback and the second feedback may be used to train (e.g. update) the model.

The new transmission patterns output/predicted by the Recommendation sub-module 512 are then sent to the Clustering module 502 and the process is repeated for the new transmission patterns. As a result, the system increases synchronisation of the transmissions scheduled on each network resource and allows for increased periods of inactivity of the network resources between transmissions, whilst ensuring (through the use of the Negotiator Module 506) that the SLAs of the IoT devices are also satisfied.

Figure 6A:
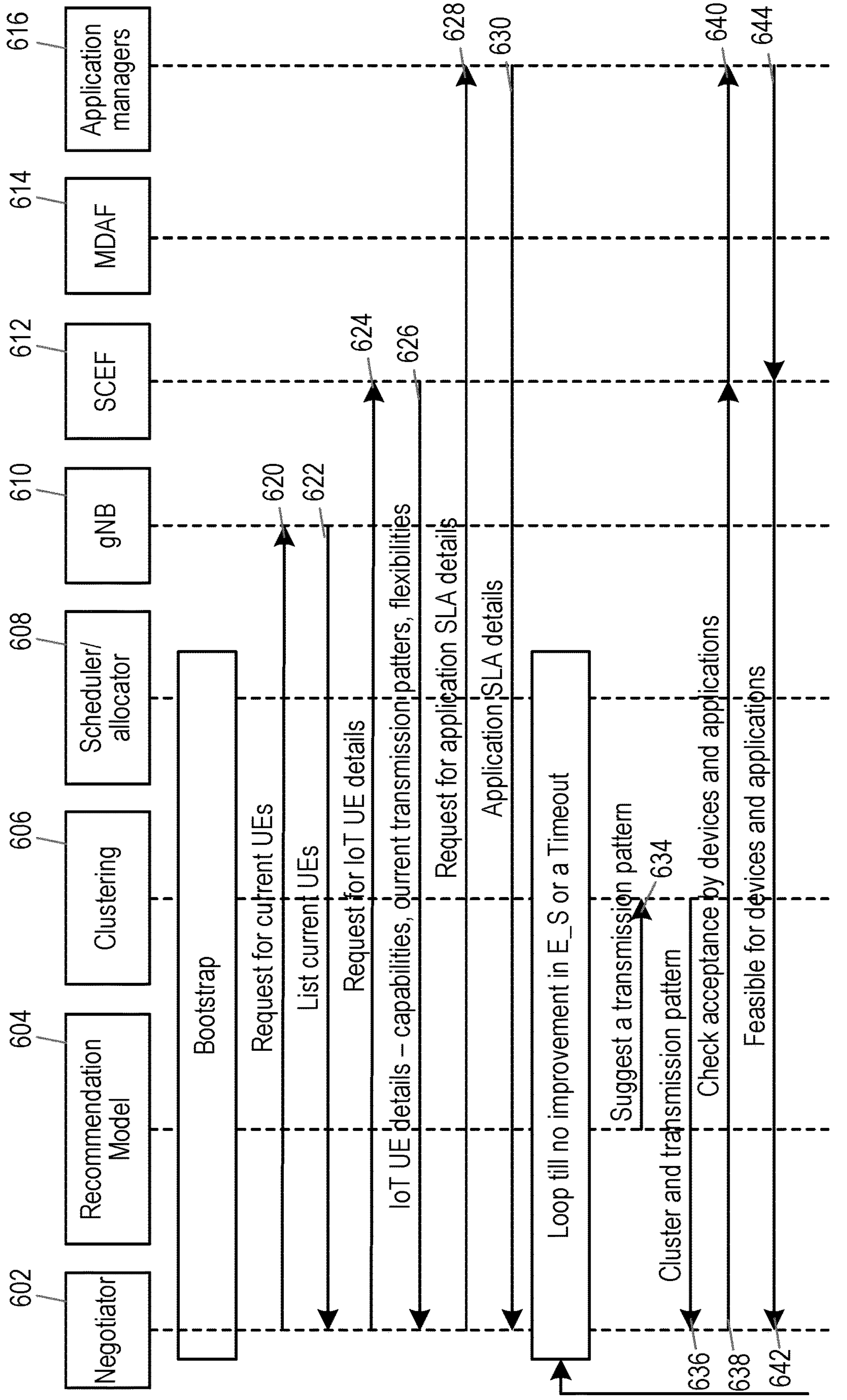
FIGS. 6a and 6b illustrate an example signaling diagram according to an example embodiment herein.
Figure 6B:
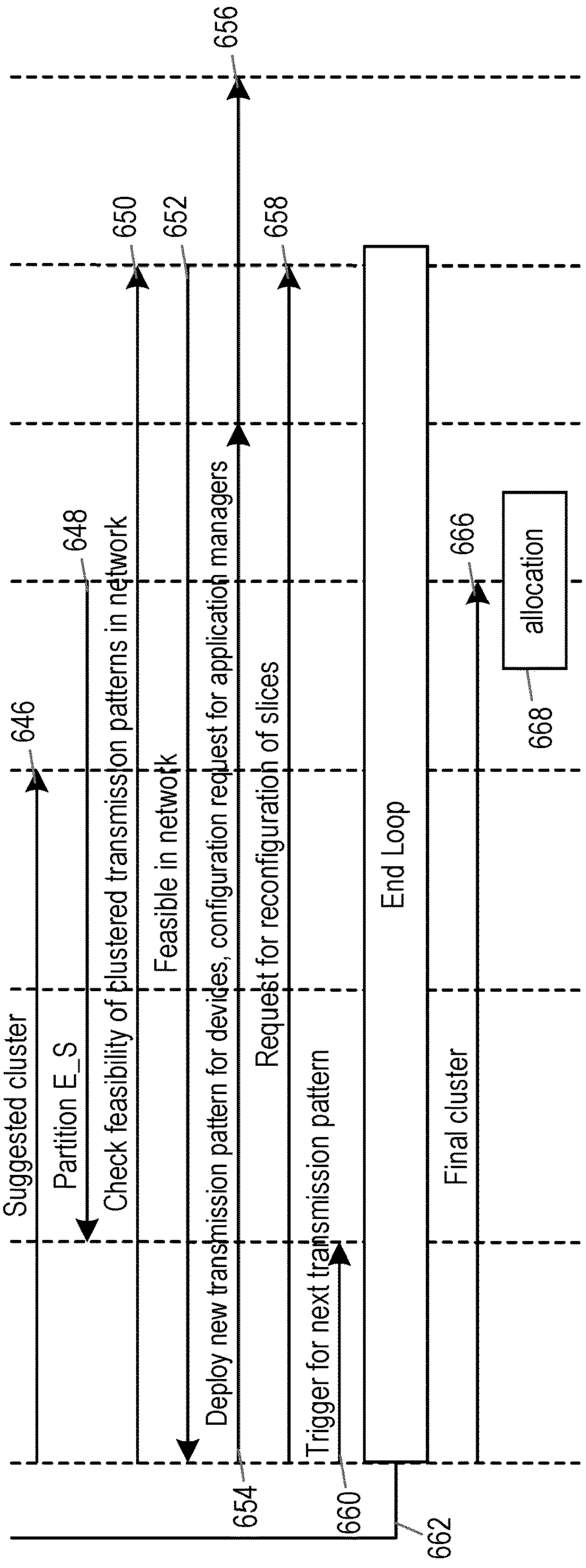

FIGS. 6*a* and 6*b* illustrate an example signalling diagram for implementing the method 400 above. In this example, a Negotiator Module 602 requests 620 a list of current UEs being serviced by one or more gNBs 610. The gNB(s)

provides the list in step 622. The Negotiator module 602 then requests 624 details of the IoT devices from a Service Capability Exposure Function SCEF 612 which are provided by the SCEF in a message 626. The Negotiator then requests 628 application SLA details from an application manager 616. The application manager 616 provides the application details in a message 630.

A loop is then performed, starting at 634 whereby the Recommendation Model 604 suggests new transmission patterns for the IoT devices, based on the information and transmission patterns obtained by the Negotiation Module 602 (in steps 624 and 626). The suggested new transmission patterns are obtained (e.g. received) by a clustering module 606 and the clustering module 606 clusters the IoT devices into clusters based on the transmission patterns.

In step 636 the clustering module 606 sends the clusters and new transmission patterns to the Negotiator 602.

In steps 638 and 640, the Negotiator Module 602 negotiates with the SCEF 612 and Application managers 616 to determine whether the new transmission patterns are acceptable e.g. in view of the SLAs of (each of) the IoT devices. The feasibility of the transmission patterns is sent 642, 644 to the Negotiator 602.

Transmissions from IoT devices in different clusters are then scheduled to different network resources. In this embodiment, a cluster of IoT devices is sent 646 to the scheduler/allocator 608 which schedules and executes transmissions from the IoT devices in the cluster. The gNB 610 which services the IoT devices in the cluster determines an energy saving associated with periods of inactivity of the network resource and sends 648 this to the recommendation model 604.

In 650 the Negotiator 610 asks the MDAF whether this transmission pattern is acceptable from network establishment point of view. In 652 is the MDAF's (in this example, positive) response. The negotiator then sends messages 654 to the SCEF and through the SCEF to the application manager 656 to initiate any changes that are needed to implement the new transmission patterns. Then the negotiator 602 sends a message 658 to the MDAF 614 to setup networking changes (if needed). In 660, the negotiator sends a message comprising information to the recommendation model 604 indicating whether the suggested cluster led to a successful negotiation. This process is performed in a loop (634-660). Final clusters may be sent 666 to the network resources (e.g. gNBs) for allocation 668.

Turning now to another embodiment, in some embodiments there is a computer program comprising instructions which, when executed on at least one processor, cause the at least one processor to carry out any of the methods herein, such as the method 400 described above. In other embodiments there is a carrier containing a computer program as above. The carrier comprises one of an electronic signal, optical signal, radio signal or computer readable storage medium. In other embodiments there is a computer program product comprising non transitory computer readable media having stored thereon a computer program as described above.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

ANNEX 1

| Feature | Description |
|---|---|
| Micro sleep Tx | Always on in supporting radio products, network wide |
| LESS (Low Energy Scheduler Solution) | On in all cells with Micro Sleep Tx active |
| MIMO Sleep Mode (MSM) | On in all cells with MIMO |
| Cell Sleep Mode (CSM) | On for all capacity cells |

The invention claimed is:

1. A computer implemented method performed by a node in a communications network for scheduling transmissions of a plurality of Internet of Things (IoT) devices to network resources in the communications network, the method comprising:

obtaining transmission patterns of transmissions from the IoT devices;

clustering the IoT devices into clusters based on the obtained transmission patterns;

scheduling transmissions of IoT devices in different clusters to different network resources;

obtaining transmission patterns for one or more User Equipments (UEs) that are making transmissions using the network resources, the one or more UEs being different devices having a different device type from the IoT devices;

selecting new transmission patterns for the IoT devices, the new transmission patterns being predicted to result in clustering with increased synchronisation of the transmission patterns of the IoT devices in the clusters, selecting the new transmission patterns for the IoT devices comprising selecting new transmission patterns for the IoT devices so as to increase a measure of overlap between the transmission patterns of the IoT devices and the transmission patterns of the one or more UEs; and repeating the clustering and scheduling for the new transmission patterns.

2. The method as in claim 1, wherein the new transmission patterns comprise perturbations of the obtained transmission patterns, and wherein the perturbations are based on predetermined flexibilities associated with the transmission patterns of the IoT devices.

3. The method as in claim 1, wherein selecting new transmission patterns for the IoT devices comprises:

using a model trained using a machine learning process to select the new transmission patterns, wherein the model takes as input transmission parameters of the IoT devices and outputs the new transmission patterns for the IoT devices, based on the transmission parameters.

4. The method as in claim 3, wherein the model is trained to output transmission patterns for the IoT devices that optimise a number of clusters one or both of obtained when clustering the IoT devices and that are predicted to satisfy performance requirements of the IoT devices.

5. The method as in claim 3, further comprising:

providing a first feedback to the model based on the clusters; and re-training the model, using the first feedback, to output transmission patterns that increase synchronisation of the transmissions scheduled on each network resource.

6. The method as in claim 5, wherein the first feedback comprises a measure of energy usage associated with the network resources performing the scheduled transmissions.

7. The method as in claim 6, wherein the measure of energy usage comprises a measure of an energy saving associated with the periods of inactivity of the network resources.

8. The method as in claim 5, further comprising:

negotiating with the IoT devices to determine whether the new transmission patterns satisfy performance requirements of the IoT devices.

9. The method as in claim 8 further comprising:

providing a second feedback to the model based on an outcome of the negotiating; and re-training the model, using the second feedback, to output transmission patterns for the IoT devices that satisfy the performance requirements of the IoT devices.

10. The method as in claim 5, further comprising:

repeating the clustering and the scheduling using the re-trained model.

11. The method as in claim 3, wherein the model takes as input transmission parameters comprising one or more from a group consisting of:

the obtained transmission patterns;

flexibility associated with the obtained transmission patterns obtained;

service level agreements;

a time of day; and locations;

of the IoT devices.

12. The method as in claim 3, wherein the model comprises a reinforcement learning agent.

13. The method as in claim 12, wherein the reinforcement learning agent receives positive rewards for predicting transmission patterns that lead to one or both of energy savings of the network resources and acceptance by the IoT devices.

14. The method as in claim 3, wherein the model comprises a neural network model.

15. The method as in claim 1, wherein clustering the IoT devices based on the obtained transmission patterns comprises clustering the IoT devices based on one or more from a group consisting of:

performance patterns;

network access patterns;

coverage areas;

data rates; and criticality of the IoT devices.

16. The method as in claim 1, wherein the increased periods of inactivity comprise one or both of more frequent periods of sleep mode and longer periods of sleep mode.

17. A node in a communications network for scheduling transmissions of a plurality of Internet of Things (IoT) devices to network resources in the communications network, the node comprising:

a memory comprising instruction data representing a set of instructions; and a processor configured to communicate with the memory and to execute the set of instructions, the set of instructions, when executed by the processor, causing the processor to:

obtain transmission patterns of transmissions from the IoT devices;

cluster the IoT devices into clusters based on the obtained transmission patterns;

schedule transmissions of IoT devices in different clusters to different network resources;

obtain transmission patterns for one or more User Equipments (UEs) that are making transmissions using the network resources, the one or more UEs being different devices having a different device type from the IoT devices;

select new transmission patterns for the IoT devices, the new transmission patterns being predicted to result in clustering with increased synchronisation of the transmission patterns of the IoT devices in the clusters, selecting the new transmission patterns for the IoT devices comprising selecting new transmission patterns for the IoT devices so as to increase a measure of overlap between the transmission patterns of the IoT devices and the transmission patterns of the one or more UEs; and repeat the clustering and scheduling for the new transmission patterns.

18. A non-transitory computer storage medium storing a computer program comprising instructions which, when executed on at least one processor, cause the at least one processor to carry out a method for scheduling transmissions of a plurality of Internet of Things (IoT) devices to network resources in the communications network, the method comprising:

obtaining transmission patterns of transmissions from the IoT devices;

clustering the IoT devices into clusters based on the obtained transmission patterns;

scheduling transmissions of IoT devices in different clusters to different network resources;

obtaining transmission patterns for one or more User Equipments (UEs) that are making transmissions using the network resources, the one or more UEs being different devices having a different device type from the IoT devices;

selecting new transmission patterns for the IoT devices, the new transmission patterns being predicted to result in clustering with increased synchronisation of the transmission patterns of the IoT devices in the clusters, selecting the new transmission patterns for the IoT devices comprising selecting new transmission patterns for the IoT devices so as to increase a measure of overlap between the transmission patterns of the IoT devices and the transmission patterns of the one or more UEs; and repeating the clustering and scheduling for the new transmission patterns.

* * * * *